(12) United States Patent
Wartenhorst

(10) Patent No.: US 8,683,945 B2
(45) Date of Patent: Apr. 1, 2014

(54) METHOD AND DEVICE FOR MILKING ANIMALS

(75) Inventor: Bernhard Schulze Wartenhorst, Warendorf (DE)

(73) Assignee: GEA Farm Technologies GmbH, Bönen (DE)

( * ) Notice: Subject to any disclaimer, the term of this patent is extended or adjusted under 35 U.S.C. 154(b) by 315 days.

(21) Appl. No.: 12/085,481

(22) PCT Filed: Nov. 27, 2006

(86) PCT No.: PCT/EP2006/011340
§ 371 (c)(1),
(2), (4) Date: Oct. 17, 2008

(87) PCT Pub. No.: WO2007/060003
PCT Pub. Date: May 31, 2007

(65) Prior Publication Data
US 2009/0151642 A1   Jun. 18, 2009

(30) Foreign Application Priority Data
Nov. 25, 2005 (DE) .......................... 10 2005 056 633

(51) Int. Cl.
*A01J 3/00* (2006.01)

(52) U.S. Cl.
USPC .................................... 119/14.02; 119/14.52

(58) Field of Classification Search
USPC .......... 119/14.02, 14.08, 14.17, 14.38, 14.41, 119/14.47
See application file for complete search history.

(56) References Cited

U.S. PATENT DOCUMENTS

| 3,754,532 | A |   | 8/1973  | Troberg et al. |           |
|-----------|---|---|---------|----------------|-----------|
| 4,011,838 | A | * | 3/1977  | Nordegren et al. | 119/14.08 |
| 4,292,926 | A | * | 10/1981 | Tilman         | 119/14.02 |
| 4,572,104 | A | * | 2/1986  | Rubino         | 119/14.02 |
| 5,218,924 | A | * | 6/1993  | Thompson et al. | 119/14.02 |
| 5,443,035 | A | * | 8/1995  | Lind et al.    | 119/14.02 |
| 5,970,910 | A | * | 10/1999 | Grimm et al.   | 119/14.02 |

FOREIGN PATENT DOCUMENTS

| DE | 36 09 275    | A1 |   | 9/1987 |          |
|----|--------------|----|---|--------|----------|
| DE | 3609275      | A1 | * | 9/1987 | A01J 5/00 |
| DE | 39 06 475    | A1 |   | 9/1990 |          |
| DE | 195 21 569   | A1 |   | 1/1997 |          |
| DE | 100 02 882   | A1 |   | 7/2001 |          |
| EP | 0 727 137    | A1 |   | 1/1996 |          |

OTHER PUBLICATIONS

English language Abstract, Translated Description and Claims of DE 36 09 275 A1, European Patent Office's esp@cenet.com database, 6pp.

(Continued)

*Primary Examiner* — Daniel J Troy
*Assistant Examiner* — Joshua Huson
(74) *Attorney, Agent, or Firm* — Smith Law Office

(57) ABSTRACT

The present invention relates to a method for milking animals wherein a negative pressure is periodically built up and relieved in a teat cup gap at a predetermined rate. The negative pressure is maintained over a predetermined suction phase (b) and relieved over a predetermined rest phase (d). The ratio between the suction phase (b) and the rest phase (d) changes at least once during the milking operation. In a preferred embodiment the first duration does not exceed a predetermined, first limit value and the second duration does not fall beneath a predetermined, second limit value.

15 Claims, 2 Drawing Sheets

(56) References Cited

OTHER PUBLICATIONS

Figure 1:
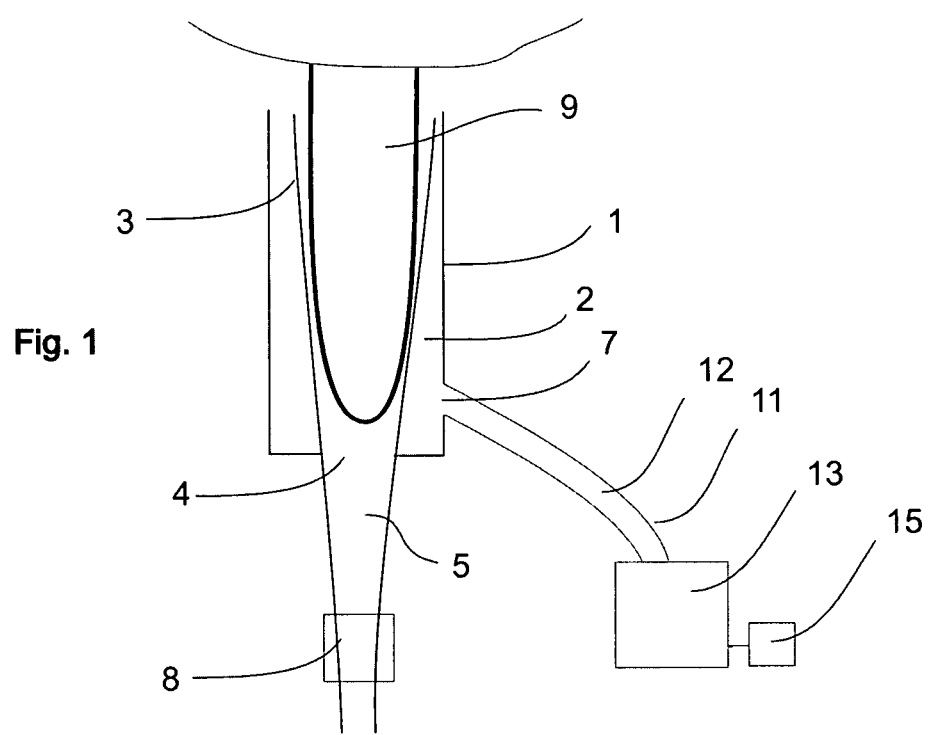

English language Abstract, Translated Description and Claims of DE 39 06 475 A1, European Patent Office's esp@cenet.com database, 3pp.

English language Abstract, Translated Description and Claims of DE 100 02 882 A1, European Patent Office's esp@cenet.com database, 5pp.

English language Abstract, Translated Description and Claims of DE 195 21 569 A1, European Patent Office's esp@cenet.com database, 3pp.

English language Abstract, Translated Description and Claims of EP 0 727 137 A1, European Patent Office's esp@cenet.com database, 5pp.

PCT/IB/338, Notification of Transmittal of Translation of the International Preliminary Report on Patentability received Aug. 4, 2008, 1p.

PCT/IB/373, International Preliminary Report on Patentability received Aug. 4, 2008, 1p.

PCT/ISA/237, (Translated) Written Opinion of the International Searching Authority, 5pp.

English language translation of DE 36 09 275, 23pp.

* cited by examiner

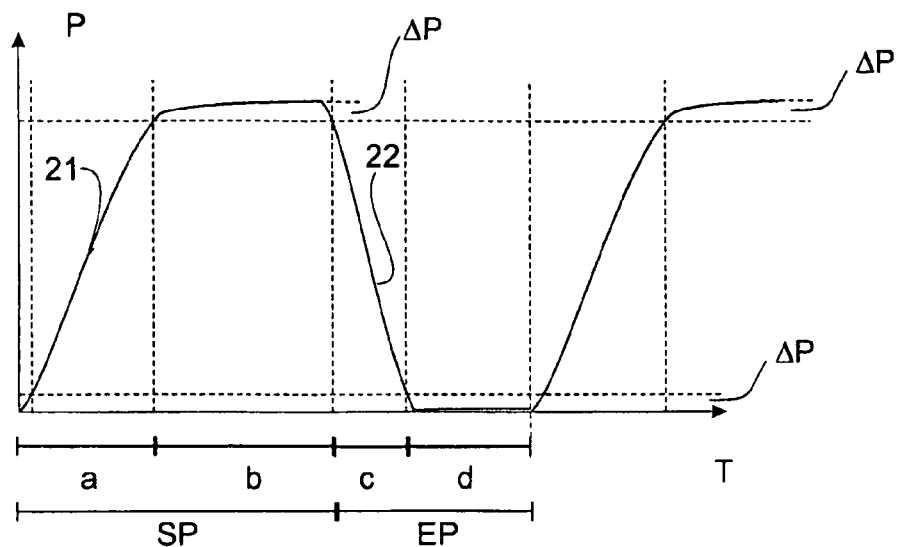
Fig. 2
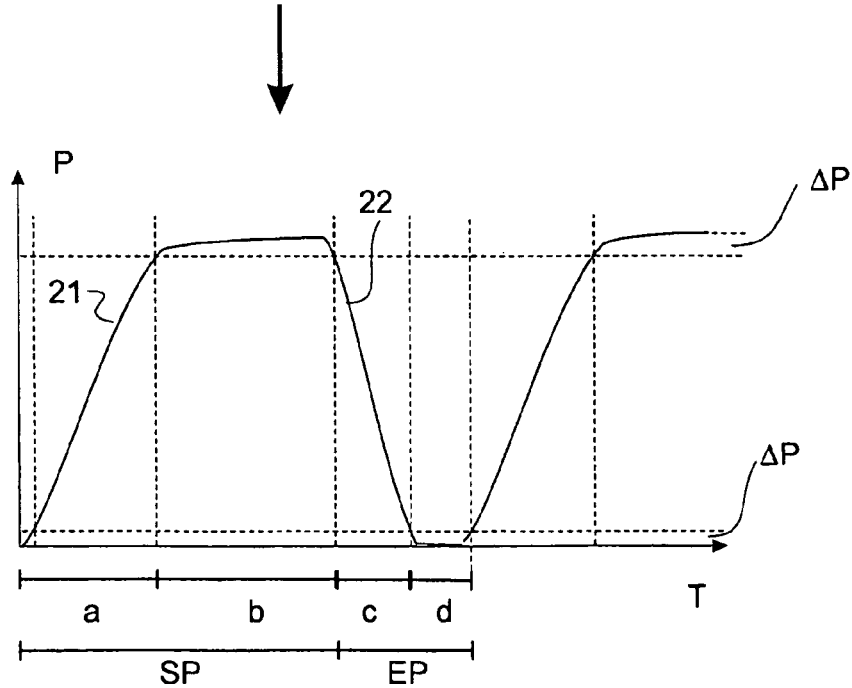

METHOD AND DEVICE FOR MILKING ANIMALS

The present invention relates to a method and an apparatus for milking animals. The invention will be described in conjunction with a method and an apparatus for milking cows. It is pointed out though that the present invention can also be employed for milking methods and milking apparatus for milking sheep, goats, camels, dromedaries, buffaloes, yaks, elks, horses, and other lactating animals.

A plurality of milking methods is known from the prior art. In the so-called pulsation method, decreased pressure and e.g. atmospheric pressure are periodically applied to the pulsation chamber of a two-chamber teat cup between the liner and the teat cup sleeve, while a constant vacuum is applied to the teat chamber. Changing between vacuum and atmospheric air will cause a pulsating movement of the liner. In the rest phase in which the air in the teat cup gap is usually at atmospheric pressure, the liner will bear against the teat, relieving the teat, while in the suction phase there will be a vacuum in the teat cup gap such that the liner is open and milk is drawn.

The pulsation methods known from the prior art typically use a fixed ratio or a fixed pulse rate and a pulsation ratio during the milking operation. The pulse rate or the suction rate is preset once in relation to species, type of milking installation and milking unit configuration and then controlled continuously independently of the course of milking.

Additionally, methods are known in which the extracted milk yield is determined and in which for example the milking process is terminated dependent on the current milk flow. In this case a control pulse is emitted to stop the pulsator. With the actuation of a start button as milking is started for a new animal, the pulsator is reactivated, performing its pulsation function as preset.

Furthermore, milk flow-related pulsation systems are known from the prior art. The pulse rate is adapted to and displaced according to the milk flow intensity. Thus, as the milk flow increases, the pulse rate is reduced such that the suction phase will be prolonged. However, the duration of the rest phase is prolonged as well by way of the slowed pulsation rate and the consequently markedly longer pulsation cycle.

This is why the milk flow-controlled pulsation systems known from the prior art achieve only a minor improvement of milk flow rates.

Therefore it is the object of the present invention to provide a method and an apparatus which allow an improved milking rate and teat condition. Preferred specific embodiments are intended to additionally achieve a higher milk flow by utilizing an optimal milk flow profile from the teats.

According to the invention this object is fulfilled by a method according to claim 1 and an apparatus according to claim 17. Advantageous embodiments and specific configurations are the subjects of the subclaims.

The invention may be employed in conventional milking, machine milking, and in semi-automatic milking. Application is also conceivable in systems where the teat cups are placed on the animal teats semi-automatically or fully automatically or robot-assisted and/or computer-controlled. Milking may be performed by quarter or a milk collection piece may be provided to receive milk hoses leading off the teat cups.

In the method according to the invention a decreased or negative pressure in a teat cup gap is periodically built up and relieved at a predetermined rate. Said negative pressure is retained over a first, predetermined duration, the suction phase (b), while over a second, predetermined duration, the rest phase (d), said negative pressure remains relieved.

According to the invention the ratio between the first duration and the second duration is changed at least once during the milking operation.

Overall, one or each pulse cycle may be subdivided into an evacuation phase (a), a vacuum phase (b), a ventilation phase (c), and a pressure phase (d). In the evacuation phase (a) the pulsation chamber and thus the teat cup gap is vented and the liner arranged in the teat cup opens. In the vacuum phase (b) the liner is open and milk is extracted from the teat. The evacuation phase (a) and the vacuum phase (b) combined are referred to as the entire suction phase (a+b).

During the ventilation phase (c) the pulsation chamber and thus the teat cup gap is ventilated with atmospheric air, the liner collapses due to the difference between external and internal pressure and the milk flow dries up. During the pressure phase or rest phase (d) the liner is completely closed, and a clamping pressure is applied to the teat tissue. The ventilation phase (c) and the pressure phase (d) combined are referred to as the entire rest phase (c+d).

The pulse rate indicates the count of pulse cycles per minute. Typical duration ratios between the entire suction phase (a+b) and the entire rest phase (c+d) are 50:50 or 65:35.

It has been found that an extension of the suction phase (b) above 700 ms does not result in a further milk flow increase but may even cause a decreased milk flow from the teats, and that an extension of the rest phase, specifically the d phase, can have a negative impact on the teat condition during milking such that a teat tip deforming due to too long pressure loads will have a reduced milk flow intensity in the initial 50-100 ms because the tissue must restore itself to a corresponding milking condition; thus the invention is based on the principle that the b phase must never exceed approximately 700 ms and simultaneously the portion of the d phase is reduced under milk flow as a threshold x is reached (starting preferably above or equal to a value of 1.5 liters/min), until a minimum value of approximately 50 ms is reached.

Preferably the duration for cows in the suction phase (b) includes a range between larger than or equal to 300 and smaller than or equal to 700 ms, the preferred upper limit of the duration of the suction phase (b) lies between 400 ms and 600 ms and particularly preferably between 470 ms and 530 ms.

Preferably the duration for cows in the rest phase (d) includes a range between approximately larger than or equal to 50 and approximately smaller than or equal to 250 ms, the preferred upper limit of the duration of the rest phase (d) lies between 100 ms and 200 ms and particularly preferably between 130 ms and 170 ms. The two phases are defined in this way. For other animals, correspondingly adapted limit values apply.

In preferred specific embodiments of the invention at least one milk flow value is determined for the milk extracted per unit time at least temporarily for at least one teat of the animal to be milked. The milk flow value may be determined for each teat individually.

Then the ratio of the durations (b) and (d) is preferably changed in dependence on the milk flow value.

Advantageously the duration of the suction phase (b) is extended in at least one process step, while the duration of the rest phase (d) is reduced. Changing the durations may occur simultaneously or substantially immediately successively such that at least one extended period is provided during milking in which an extended duration of the suction phase (b) and a reduced duration of the rest phase (d) are provided simultaneously. This process step is performed preferably at the beginning of the main milking phase or within the main milking phase.

Preferably the duration of the rest phase (d) is extended in at least one process step, while the duration of the suction phase (b) is reduced. Changing the durations may again occur simultaneously or substantially immediately successively such that at least one extended period is provided during milking in which an extended duration of the rest phase (d) and a reduced duration of the suction phase (b) are provided simultaneously. This process step may be performed e.g. at the beginning of the post-milking phase or within the post-milking phase.

Preferably the duration of the d phase is set to the maximum indicated above as the milk flow reaches a specific threshold. Said threshold may change in the course of the milking process with the initial threshold particularly preferably assumed at 1.5 l per minute. For example the rest phase (d) may be reduced starting at a milk flow value of 1.5 l per minute from e.g. 250 ms with increasing milk flow until the minimum duration of e.g. 50 ms is reached.

Studies on the milk flow from cow teats have shown that milk exit is not steady over time. It would appear that a short, recurring phase of an optimal milk flow exists. The milk flow remains steady over a duration of approximately 600 ms. Then the milk flow clearly drops, remaining in a second stage at a rather constant, low level. This stage, however, only yields a milk flow intensity of 50-60% of the initial value.

Milk-flow related pulsations performed in the prior art had the objective of changing pulsation at increasing milk flows such that the liner open phases employed clearly exceeded 600 ms up to 1100 ms. Since the pulsation rate was as a rule markedly reduced so as to obtain these values, not only the duration of the suction phase portions (b) was extended but so was that of the rest phases (d).

Preferably the rate at which the negative pressure is building up and relieved is changed at least once during the milking operation. It is conceivable for the negative pressure to build up quite rapidly, i.e. at a steep slope, or else slowly. When changing the rate it is preferred to also change the ratio between the length, i.e. the duration of the suction phase (b) and the length, i.e. the duration of the rest phase (d).

Preferably the ratio between the duration in the suction phase (b), measured in ms, and the duration in the rest phase (d), measured in ms, is larger than 1 during the milking operation, at least for a time. This means that during a milking operation the suction phase (b) in ms is, at least for a time, longer than the rest phase (d) in ms. Preferably the duration of the suction phase (b), measured in ms, is longer than the duration of the rest phase (d), measured in ms, substantially during the entire milking operation. Preferably the first duration in ms is at least twice as long, preferably at least three times as long as the second duration in ms.

The same preferably applies to the lengths or durations of the entire suction phase (a+b) and the entire rest phase (c+d).

In another preferred method the negative pressure is separately applied to multiple teat cups placed on multiple teats of an animal. In this way one can take into account the fact that during the milking operation different teats show different milking behavior. In this way extracting milk can be individually adapted to each teat of the animal.

As the milk flow increases, the preset duration in the suction phase (b) is preferably increased relative to the duration in the rest phase (d). This means that the suction phase is increased relative to the rest phase and in this way more milk is extracted during a pulse cycle. Preferably the duration of the rest phase (d) is reduced at least once during the milking operation. Reducing the duration of the rest phase (d) causes the ratio between the duration of the suction phase (b) and the duration of the rest phase (d) to be shifted toward the first duration and in this way the entire milking operation will be more efficient.

Preferably the milk flow rate of the animal to be milked is determined and the ratio of the two durations is changed in response to the determined milk flow rate. In this controlling or regulating method the durations are adapted as described in dependence on the actual milk flow rate, i.e. the extracted milk per unit time. For example one can increase the suction phase percentage during high milk flow and then again reduce it during low milk flow.

It is preferred to change the ratio of durations independently for multiple teats such that, as indicated above, it is taken into account that different teats show different characteristics when giving milk. Preferably the ratio of the durations is changed in a predetermined way. This means that for example the durations are adapted in a predetermined way over the entire milking operation on the basis of a program. The corresponding milking program may preferably include the number of milkings per day, the times between milking, the typical milk flow from the data history or the milk flow profile of previous milkings, the current milk flow and the like.

Preferably the ratio of the two durations is changed continually at least in part. This means that for example in dependence on an observed change in the milk yield the durations or their ratio relative to one another are changed continually. This may occur for example by way of continually changing the suction phase duration (b) or the rest phase duration (d).

Also, the durations of the two phases may be changed continually. In another preferred embodiment the respective durations are changed in steps at least in part. This means that at least either the rest phase or the suction phase is increased or reduced in steps.

It is further preferred to maintain a specific ratio between the duration of the suction phase (b) and the duration of the rest phase (d) for a predetermined length. Said maintaining serves those phases of the milk flow in which it is substantially constant.

Preferably the predetermined duration is specified taking into account at least one predetermined parameter. This means that the ratios between the two durations is not or not only specified in dependence on a measured milk flow rate but it is specified previously. By means of a correspondingly adapted program one can thus select a specific ratio for a specified time during milking, a different ratio for another time, and so on. The ratios may be derived from the measured values of the milk flow profiles of preceding milkings.

Preferably the predetermined operating value is selected from a group of operating values including, the potential yield of a herd, the number of milkings per day, the times between milking, the presence of milk yield, the presence of cistern milk yield, the presence of alveolar milk yield, the individual milk flow intensity of the animal, and combinations thereof or the like.

In relation to said operating values, a corresponding setting is maintained over a preferably pre-settable time.

In this method, an optimal milk flow curve is used as the basis by means of a timer control and the pulse settings are controlled accordingly. It may be assumed for example that after placement of the milking units the milk flow requires a predetermined time, e.g. 30 seconds, to reach its optimal level. Milking is started at pulsator settings preset for the herd. In the case of individual animal identification, pulsator settings matched to the individual animal may be employed. Then, after the indicated 30 seconds, plus some more predetermined time matched to the time required for placing the milking units and/or after pressing a start button, pulsation is set to optimizing. Optimizing occurs on the basis of the operating values indicated above, wherein individual or multiple or all of said operating values may be employed.

Said optimized pulsation is maintained over an adjustable time. After said optimized phase ends, the pulsator settings are reset to the initial values within a predetermined time, for example within 5 seconds. Said initial value is then maintained for the remainder of milking. The durations shown may vary, however, depending on the embodiment or the animal to be milked.

During the indicated optimizing phase, electronic controls such as pulsation valves may be used to control the length of the suction phase (b) and the length of the rest phase (d) as illustrated.

This means that preferably the ratio between the two durations is changed to an amended value based on an initial value and subsequently reset to the initial value.

Also the length or duration of the evacuation phase and the length of the suction phase may be varied e.g. by way of dynamically adapting the cross-sections of the evacuation and ventilation valves.

The present invention is furthermore directed at an apparatus for milking animals, comprising at least one teat cup to be placed on a teat of the animal to be milked, and an air suction apparatus for building up a negative pressure in the teat cup gap in recurring phases. Additionally a control device is provided for controlling a first duration during which the negative pressure is maintained, and a second duration during which the negative pressure remains relieved. According to the invention said control device controls the first duration in the suction phase (b) and the second duration in the rest phase (d) such that the ratio between the two durations will change at least once during the milking operation.

Again, the milking operation is understood to mean the entire operation from placing the teat cups to removing the teat cups from the udder or the teats, respectively.

The invention may be employed in milking per teat or in milking operations in which pairs of teats are milked jointly. It is preferred to adapt the duration of the suction phase (b) and the duration of the rest phase (d) to each teat or to each individually controlled unit corresponding to the configurations described above.

The apparatus according to the invention is in particular employed for applying the method described above according to the invention. According to the invention the first duration, i.e. the length of the suction phase (b), does not exceed a predetermined range. When milking cows said first predetermined range lies particularly preferably between larger than or equal to 300 ms and smaller than or equal to 700 ms, preferably the top limit of the duration of the suction phase (b) lies between 400 ms and 600 ms and particularly preferably between 470 ms and 530 ms.

In another preferred embodiment the second duration, i.e. the rest phase (d), remains in a second, predetermined range. When milking cows said second, predetermined range lies preferably between larger than or equal to 50 ms and smaller than or equal to 250 ms, in particular the top limit of the duration of the rest phase (d) lies between 100 ms and 200 ms and particularly preferably between 130 ms and 170 ms.

In another preferred embodiment the apparatus comprises a milk flow meter or milk yield meter for determining the milk yield extracted per unit time and emitting a control signal corresponding to said milk yield to the control device. As indicated above, the durations may be adapted in dependence on the milk yield extracted per unit time such that for example in the case of a higher milk yield per unit time the suction phase (b) is extended. In this way the control device controls the first and second durations in dependence on the control signal within the scope of the predetermined durations.

The following example illustrates the interaction between the indicated milk flow signal and adaptation of the two durations. Let the entire cycle time in the pulsation cycle be 1000 ms, the suction phase (b) 530 ms and the rest phase (d) 250 ms. In the present apparatus, 530 ms is the maximum value for the suction phase (b). When the control signal indicates an increased milk flow to the control device, then the actuator of the control device must not extend the suction phase (b). It is conceivable, however, to reduce the rest phase (d) for example by 100 ms. Thus the entire cycle time of this exemplary apparatus is reduced to 900 ms. Thus the count of cycles per minute will increase. Before changing the entire cycle time, a total of 31,800 ms per minute was provided for suction and after reducing to 900 ms cycle time, 35,333.33 ms are now provided for suction due to the increased cycle count, i.e. more time per minute, as desired. The time available for suction is extended by upwards of 10% which is the effective time because each suction phase in the pulse cycles is not extended arbitrarily but remains in the range of most efficient milk flow. Simultaneously the rest phase is reduced to optimally further the milk flow.

Preferably a program is stored in the control device for controlling the two durations in dependence on at least one predetermined operating quantity. Preferably the operating quantity is selected from a group of operating quantities including, the potential yield of the herd, the number of milkings per day, the times between milking, the presence of milk yield, the presence of cistern or alveolar milk yield, the milk flow intensity, or the like. In this case the duration is preferably not measured in dependence on the milk yield but is controlled by way of predetermined, expected values. Further advantages and embodiments can be taken from the accompanying drawings.

These show in:

FIG. 1 a simplistic illustration of the apparatus according to the invention;

FIG. 2 a diagram to illustrate the adjusting of durations.

FIG. 1 shows an apparatus for milking animals in a simplistic illustration. A teat cup 1 is placed on a teat 9 of a cow (not shown). In said teat cup 1, a schematically indicated liner 3 is arranged which is placed immediately on the teat of the animal.

By means of a milk exit aperture 4 the liner is taken out of the teat cup 1. The liner is connected to a milk line through a short or long milk hose and other devices as required. A constant vacuum is present in the milk hose, continuing further into the teat cup interior. An air aperture 7 serves to evacuate and ventilate the teat cup gap 2, i.e. the space between the inner wall of the teat cup 1 and the liner. For this purpose, a pulsator 13 and a pulse hose 11 draw air out of, and supply atmospheric air to, the teat cup gap.

Correspondingly, the volume of the teat cup gap 2 and the volume of the interior 12 of the pulse hose 11 need to be taken into account. This entire volume is evacuated and re-ventilated by way of pulsation within one pulse cycle (a+b+c+d phase, comprising the complete opening and closing of the liner). Volume exchanges will take place in the phases (a) (evacuate) and (c) (ventilate). Said evacuating and ventilating per pulse cycle, i.e. controlling the pulse cycles, is performed by means of a control device 15 being in connection with the pulsator 13.

Additionally to the teat cup 1 shown, more teat cups may be provided to be placed on the other teats of the animals. It is conceivable for the entire volume described above to be jointly evacuated and ventilated per pulse cycle from all of the teat cup gaps 2 and the interiors of the pulse hoses 11.

The reference numeral 8 relates to a milk yield meter or a milk flow meter. In a preferred embodiment the data emitted by the milk yield meter, which is a measure for the milk yield per unit time, is transmitted to the control device 15 for the latter to adjust pulsation in response to those values in that the duration of the suction phase (b) is intentionally influenced in relation to the duration of the rest phase (d).

The entire suction phase composed of the sub-phases evacuation (a) and steady vacuum (b), and the duration of the entire rest phase which consists of the sub-phases ventilate (c) and ventilated state (d), result in the entire duration of one pulsation process. Joining the indicated sub-phases (a), (b), (c) and (d) in series will result in an entire pulse cycle within which the liner will completely open and close. Typically there will be 60 cycles per minute, i.e. one pulse cycle lasts 1000 ms.

FIG. 2 shows the course of one pulse cycle before and after an adaptation to a specific milk flow rate, with the negative pressure plotted in the teat cup gap in relation to time. The time is plotted on the abscissa and the negative pressure, on the ordinate. The section (a+b) represents the complete suction phase SP, i.e. the duration of the suction process, and the section (c+d) the complete rest phase EP, i.e. the duration of the rest or pressing process. The top subfigure shows that the relation between the durations (a+b) and (c+d) is approximately 2:1.

The evacuation phase (a) ends as the negative pressure reaches the maximum negative pressure minus the value ΔP. Then the vacuum phase or suction phase b begins which ends as the negative pressure falls back to the maximum negative pressure minus ΔP, which is followed by the ventilation phase (c) which ends at a negative pressure ΔP where the pressure phase or rest phase (d) finally begins.

Now, when the milk yield meter determines an increased milk yield per unit time, the phase of rest (d), as illustrated in the bottom part of FIG. 2, can be adapted. In the bottom subfigure the duration (a+b) was left unchanged for the entire suction phase SP (a+b) while the duration (d) was reduced. In the bottom subfigure the relation between the durations (a+b) and (c+d) is approximately 3.

Generally there are different options of adapting the durations. Both the duration (b) and the duration (d) are adaptable according to the invention.

Additionally the entire cycle which is the sum of the durations (a+b) and (c+d), might be changed or reduced. Care is taken that the duration (b) does not exceed a predetermined value such as 700 ms, and the duration (d) does not fall below a second, predetermined value such as 50 ms and does not exceed e.g. 250 ms.

LIST OF REFERENCE NUMERALS 1 teat cup
2 teat cup gap
3 liner
4 milk exit aperture
5 teat cup interior
7 air suction aperture
8 milk yield meter
9 teat
11 pulse hose
12 pulse hose interior
13 pulsator
15 control device
21 slope
22 slope
a evacuation phase
b vacuum phase
c ventilation phase
d rest phase
SP entire suction phase
EP entire rest phase

The invention claimed is:

1. A method for milking a dairy animal, the method comprising the steps of:
   providing a pulsation cycle of a predetermined duration, comprising the steps of:
     building up a negative pressure in a teat cup gap between a teat cup and a liner at a predetermined rate in an evacuation phase;
     retaining the negative pressure over a predetermined suction phase;
     relieving the negative pressure in the teat cup gap at a predetermined rate in a ventilation phase; and
     maintaining ventilation in the teat cup gap over a predetermined rest phase;
   repeating the evacuation, suction, ventilation, and rest phases during a single milking operation and;
   building up the negative pressure in the teat cup gap between the teat cup and a liner at substantially the same rate in each evacuation phase throughout the single milking operation;
   relieving the negative pressure in the teat cup gap in every ventilation phase at substantially the same rate in each ventilation phase throughout the single milking operation;
   monitoring a milk flow rate from the liner to determine whether the milk flow rate exceeds a predetermined milk flow threshold rate; and
   reducing the duration of the pulsation cycle by changing a ratio between the suction phase and a corresponding rest phase at least once during the single milking operation by reducing a duration of a rest phase after a start of milking relative to a duration of a rest phase at the start of milking, thereby increasing the number of suction phases in the single milking operation if the predetermined milk flow threshold rate is exceeded.

2. The method according to claim 1, wherein the step of building up a negative pressure includes the step of changing a rate at which the negative pressure is built up in the teat cup gap.

3. The method according to claim 1, and further comprising the step of:
   determining a milk flow value from at least one teat of the dairy animal and the milk flow value is determined at least in part by an amount of milk extracted per unit of time.

4. The method according to claim 3, wherein the ratio between the suction phase and the rest phase is changed in dependence on the milk flow value.

5. The method according to claim 1, wherein the step of:
   changing a ratio between a suction phase and a corresponding rest phase includes the step of:
     extending a duration of the suction phase up to a predetermined maximum duration.

6. The method according to claim 1, wherein the step of:
   changing the ratio of the suction phase to the rest phase increases a pulsation rate after the start of the single milking operation by decreasing the rest phase duration.

7. The method according to claim 1, wherein the step of:
   changing the ratio between the suction phase and the rest phase further comprises the step of:

changing the ratio of the suction phase and the rest phase of a first teat of the dairy animal independently of a ratio between the suction phase and the rest phase of a second teat of the dairy animal.

8. The method according to claim 1, and further comprising the step of:
selecting an operating value for use in changing the ratio between the suction phase and its corresponding rest phase, the operating value being selected from a group of operating values consisting of: a potential milk yield of a herd of dairy animals, a number of milkings of a dairy animal per day, a period of time between two milkings of the dairy animal, a milk flow characteristic of a herd of dairy animals, milk flow characteristics of the dairy animal being milked, milk flow characteristics of each teat of the dairy animal being milked, a milk yield for the dairy animal being milked, an alveolar milk, a milk flow intensity, and combinations thereof.

9. The method according to claim 1, wherein the step of changing a ratio between the suction phase and a corresponding rest phase includes the step of:
changing the ratio from about two at the start of the single milking operation to about three after the start of the single milking operation.

10. The method according to claim 1, and further comprising the step of:
maintaining a duration of a rest phase at an end of milking to not exceed a duration of the rest phase at the start of milking in the single milking operation.

11. The method according to claim 1, and further comprising the steps of:
reducing a duration of a suction phase at a start of the single milking operation relative to a duration of a suction phase at a middle portion of the single milking operation; and
maintaining a duration of the suction phase at the end of milking to be substantially the same as the duration of the suction phase at the beginning of milking in the single milking operation.

12. The method according to claim 1, and further comprising the step of:
reducing a duration of a suction phase at the end of milking relative to a duration of a suction phase at the start of milking in the single milking operation.

13. Apparatus for milking a dairy animal, the apparatus comprising:
a teat cup defining at least a portion of a teat cup gap;
a pulsator for building up a negative pressure in the teat cup gap in recurring phases; and
a control device programmed to perform the following steps:
building up a negative pressure in a teat cup gap between a teat cup and a liner at a predetermined rate in an evacuation phase;
retaining the negative pressure over a predetermined suction phase;
relieving the negative pressure in the teat cup gap at a predetermined rate in a ventilation phase; and
maintaining ventilation in the teat cup gap over a predetermined rest phase;
repeating the evacuation, suction, ventilation, and rest phases during a single milking operation;
building up the negative pressure in the teat cup gap between the teat cup and a liner at substantially the same rate in each evacuation phase throughout the single milking operation;
relieving the negative pressure in the teat cup gap in every ventilation phase at substantially the same rate in each ventilation phase throughout the single milking operation;
control a duration of a suction phase during which the negative pressure remains built up, and to control a duration of a rest phase during which the negative pressure is relieved, and the control device is programmed to change a ratio between the duration of the suction phase and the duration of the rest phase during a single milking operation by reducing a duration of a rest phase after a start of milking relative to a duration of a rest phase at the start of milking in the single milking operation in response to whether a milk flow rate in the apparatus exceeds a predetermined milk flow threshold rate, thereby increasing the number of suction phases in the single milking operation if the predetermined milk flow threshold rate is exceeded and the control device is further programmed to relieve negative pressure in the teat cup gap in every ventilation phase at substantially the same rate during the milking operation.

14. The apparatus according to claim 13, wherein the control device is programmed to control the duration of the suction phase and the duration of the rest phase in dependence on a control signal.

15. The apparatus according to claim 13, wherein the control device is programmed to control the pulsator such that the duration of the suction phase and the duration of the rest phase can be changed to change the suction phase to rest phase ratio from about two of the start of the single milking operation to about three after the start of the single milking operation.

* * * * *

UNITED STATES PATENT AND TRADEMARK OFFICE
CERTIFICATE OF CORRECTION

PATENT NO.        : 8,683,945 B2
APPLICATION NO. : 12/085481
DATED             : April 1, 2014
INVENTOR(S)       : Bernhard Schulze Wartenhorst It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this
Thirtieth Day of May, 2017

Michelle K. Lee
*Director of the United States Patent and Trademark Office*